United States Patent
Kim

(10) Patent No.: US 7,894,635 B2
(45) Date of Patent: Feb. 22, 2011

(54) IRIS IDENTIFICATION SYSTEM INTEGRATED USB STORAGE DEVICE

(75) Inventor: Shinho Kim, Kyeungido (KR)

(73) Assignee: Rehoboth Tech Co., Ltd. (KR)

( * ) Notice: Subject to any disclaimer, the term of this patent is extended or adjusted under 35 U.S.C. 154(b) by 763 days.

(21) Appl. No.: 11/577,039

(22) PCT Filed: Sep. 10, 2005

(86) PCT No.: PCT/KR2005/003372

§ 371 (c)(1),
(2), (4) Date: Nov. 20, 2007

(87) PCT Pub. No.: WO2006/080747

PCT Pub. Date: Aug. 3, 2006

(65) Prior Publication Data

US 2008/0130959 A1 Jun. 5, 2008

(30) Foreign Application Priority Data

Oct. 11, 2004 (KR) .................. 10-2004-0080784

(51) Int. Cl.
*G06K 9/00* (2006.01)
(52) U.S. Cl. .................. 382/117; 340/5.53; 235/382; 713/186; 726/2
(58) Field of Classification Search .............. 382/115, 382/117, 124; 340/5.1, 5.2, 5.31, 5.52, 5.53, 340/5.6; 235/375, 380, 382; 713/182, 185, 713/186, 300, 320; 726/2, 4, 21; 705/1.1, 705/44

See application file for complete search history.

(56) References Cited

U.S. PATENT DOCUMENTS

| | | | |
|---|---|---|---|
| 6,016,476 A * | 1/2000 | Maes et al. | 705/18 |
| 7,213,766 B2 * | 5/2007 | Ryan et al. | 235/492 |
| 2004/0078505 A1 | 4/2004 | Yu et al. | |
| 2004/0149816 A1 | 8/2004 | Tomoeda et al. | |

(Continued)

FOREIGN PATENT DOCUMENTS

GB 2377525 A 1/2003

(Continued)

OTHER PUBLICATIONS

European Search Report; PCT/KR2005003372; Jun. 20, 2008. All references cited in the EP Search Report and not previously submitted are listed above.

(Continued)

*Primary Examiner* — Samir A Ahmed
(74) *Attorney, Agent, or Firm* — Cantor Colburn LLP

(57) ABSTRACT

An iris identification system integrated USB storage device includes a USB interface unit which includes a USB port, and a USB controller adapted to control a data transmission between the USB port and the Data Storage; a Data Storage which stores data inputted from the computer through the USB interface unit; a Data Storage Controller which allows an access from the computer to the Data Storage through the USB interface unit or disconnects the access; and an Iris Identification Device which creates an iris code from an iris image inputted from an iris photographing camera, compares the previously stored original iris code with the created iris code, and allows the Data Storage Controller to be an access allowance state or an access disconnection state.

5 Claims, 1 Drawing Sheet

U.S. PATENT DOCUMENTS

| | | | |
|---|---|---|---|
| 2006/0219776 A1* | 10/2006 | Finn | 235/380 |
| 2007/0168376 A1* | 7/2007 | Luitjens et al. | 707/102 |
| 2008/0148059 A1* | 6/2008 | Shapiro | 713/186 |
| 2009/0161922 A1* | 6/2009 | Lemke | 382/117 |

FOREIGN PATENT DOCUMENTS

| | | |
|---|---|---|
| KR | 1020030065761 | 8/2003 |
| KR | 20030091650 | 12/2003 |
| KR | 1020040042123 | 5/2004 |
| WO | 0123987 A1 | 4/2001 |
| WO | WO2004/015579 | 2/2004 |

OTHER PUBLICATIONS

International Search Report, PCT/2005-003372, Jan. 31, 2006.
Written Opinion, PCT/2005-003372, Jan. 31, 2006.

* cited by examiner

[Fig. 1]
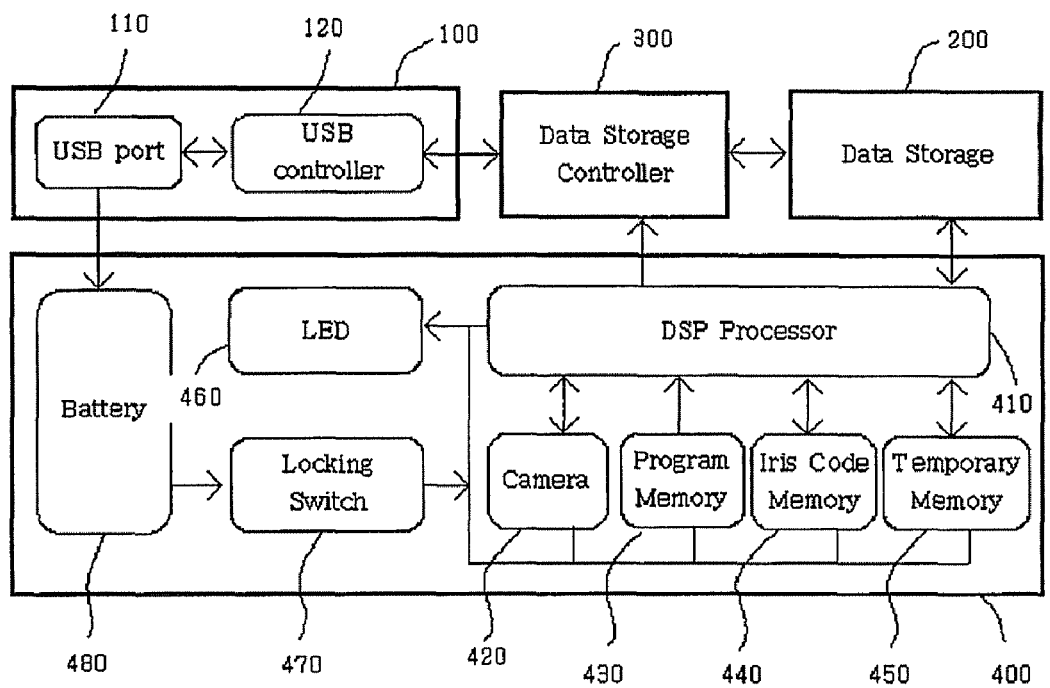
[Fig. 2]
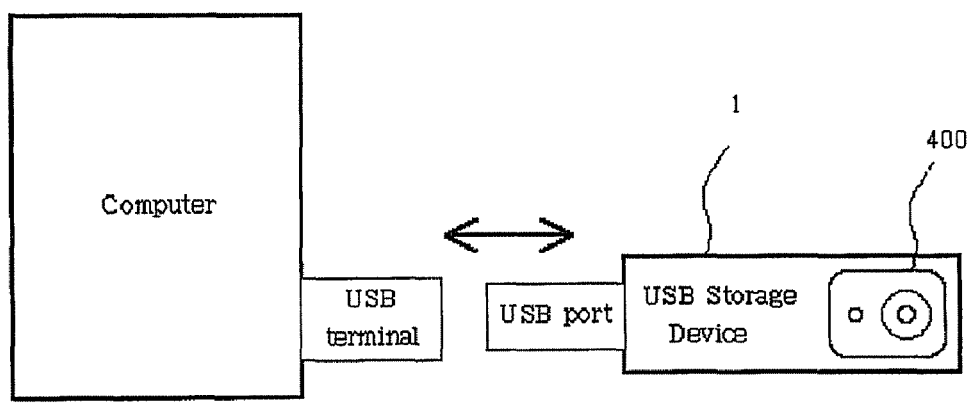

IRIS IDENTIFICATION SYSTEM INTEGRATED USB STORAGE DEVICE

TECHNICAL FIELD

The present invention relates to an iris identification system integrated USB (Universal Serial Bus) storage device, and an improved iris identification system integrated USB storage device in which a locking function is implemented using an Iris Identification Device, with an iris code being stored in a USB storage device, so that a data leakage can be prevented when a storage device is lost or robbed.

DISCLOSURE OF INVENTION

Technical Problem

As the technology of a semiconductor is advanced, a certain data storage device such as a portable flash memory, etc. becomes smaller and is designed to have a large storage capacity. With the above new trend, a security problem with respect to a data stored in a portable storage device becomes a hot issue, so that many studies has been conducted for stable and reliable security methods. Generally, as a security function of a portable storage device, a simple function such as a password, etc. has been used. In this case, it is not easy to memorize the password, and the password may be easily hacked. Therefore, as a security measurement of the USB portable storage device, a stable and high security technology is urgently needed.

Accordingly, it is an object of the present invention to provide an iris identification system integrated USB storage device which overcomes the problems encountered in the conventional art.

It is another object of the present invention to provide an iris identification system integrated USB storage device in which there is provided an iris identification system capable of using a data of a storage device after a user's iris is identified and verified as a verification procedure of a user of a storage device when using the same. With the above construction, it is possible to prevent a data leakage when a storage device is lost or robbed.

Technical Solution

The present invention provides a USB (Universal Serial Bus) storage device equipped with an iris identification system, including: a USB interface unit including a USB port interfacing with a USB terminal of a computer to exchange data with the computer, and a USB controller adapted to control a data transmission between the USB port and a data storage; a data storage storing data inputted from the computer through the USB interface unit; a data storage controller allowing the computer to access the data storage through the USB interface unit or preventing the computer from accessing the data storage through the USB interface unit; and an iris identification device including a secondary battery. The iris identification device generates an iris code from an iris image inputted from an iris camera and compares a stored original iris code with the generated iris code when the USB storage device is not connected to the computer through the USB interface unit and is powered by the battery, and controls the data storage controller to allow or prevent an access to the data storage according to whether or not the compared iris codes match each other when the USB storage device is connected to the computer through the USB interface unit.

To achieve the above objects, in a USB storage device having a USB port which is interfaced with a USB terminal of a computer for thereby exchanging a data with a computer, there is provided an iris identification system integrated USB storage device, comprising a USB interface which includes a USB port, and a USB controller adapted to control a data transmission between the USB port and the Data Storage; a Data Storage which stores data inputted from the computer through the USB interface unit; a Data Storage Controller which allows an access from the computer to the Data Storage through the USB interface unit or disconnects the access; and an Iris Identification Device which creates an iris code from an iris image inputted from an iris photographing camera, compares the previously stored original iris code with the created iris code, and allows the Data Storage Controller to be an access allowance state or an access disconnection state based on the matching state for thereby determining an access from the computer to the Data Storage.

ADVANTAGEOUS EFFECTS

As described above, with the iris identification system integrated USB storage device comprising an original iris code previously stored in an Iris Code Memory, a Program Memory which has an iris identification program so that a match with an iris code of an authenticator obtained from a camera when is use is judged, and an operation state of a device is determined based on a result of the judgment, an independent DSP (Digital Signal Process) processor which loads an iris identification program from the Program Memory and controls the same, it is possible to achieve a high level security effect with respect to the leakage of a data when a portable storage device is lost or robbed in such a manner that a USB storage device can be used by only a user who has a right to use based on an iris identification when a USB storage device is connected with a computer and is used.

BRIEF DESCRIPTION OF THE DRAWINGS

FIG. 1 is a block diagram illustrating an iris identification system integrated USB storage device according to the present invention; and FIG. 2 is a view illustrating an example that an iris identification system integrated USB storage device is adapted to a computer according to the present invention.

MODE FOR THE INVENTION

The preferred embodiments of the present invention will be described with reference to the accompanying drawings.

FIG. 1 is a block diagram illustrating an iris identification system integrated USB storage device (1) according to the present invention, and FIG. 2 is a view illustrating an example that an iris identification system integrated USB storage device (1) is adapted to a computer according to the present invention.

As shown in FIGS. 1 and 2, an iris identification system integrated USB storage device (1) according to the present invention is connected with a USB terminal of a computer and comprises a USB interface unit (100), a Data Storage (200), a Data Storage Controller (300), and an Iris Identification Device (400).

The USB interface unit (100) includes a USB port and a USB controller, with the USB controller being connected with the Data Storage (200) in accordance with a control of the Data Storage Controller (300) and being designed to control the flow of a data exchange between the computer and the Data Storage (200).

The Data Storage (200) may be formed of a non-volatile flash memory capable of storing the data inputted through the USB interface unit (100) or a magnetic hard disk. The Data Storage (200) may additionally store a program code and an iris code used in the Iris Identification Device and may be used on behalf of the Program Memory and the Iris Code Memory of the Iris Identification Device (400), so that the construction of the Iris Identification Device (400) may be simplified.

The Data Storage Controller (300) is an integrated circuit formed of transistors and prevents the USB interface unit (100) from being connected with the Data Storage (200) or allows the same to be connected with the Data Storage (200) in accordance with a control based on the security state of the Iris Identification Device (400). Here, the Iris Identification Device (400) includes a Program Memory (430), a DSP Processor (410), a Camera (420), an Iris Code Memory (440), a Temporary Memory (450), an operation state indication LED (460), a Locking Switch (470), and a Battery (480).

The Program Memory (430) of the Iris Identification Device (400) receives an iris image from the Camera (420), creates a reference iris code, judges a match between the original iris code and the reference code, and controls the Data Storage Controller (300) based on a result of the match. The devices for storing the iris identification algorithm and program, which are used so as to determine the operation state of the storage device, are generally formed of a ROM or an EPROM.

The DSP Processor (410) of the Iris Identification Device (400) is connected with the Battery (480), the Locking Switch (470), the operation state indication LED (460), the Program Memory (430), the Iris Code Memory (440), the Camera (420), the Data Storage Controller (300), and the Data Storage (200), so that the DSP Processor (410) loads an iris identification and program from the Program Memory (430) and executes the same.

The Iris Code Memory (440) of the Iris Identification Device (400) stores an original iris code data used for verification and is formed of a non-volatile memory (flash memory).

The Camera (420) of the Iris Identification Device (400) includes a CCD (Charge Coupled Device) or a CMOS (Complementary Metal-Oxide Semiconductor) image sensor, a lens, an iris induction LED, and an infrared ray LED and takes a picture of an authenticator and transfers an iris image data to the DSP Processor.

The operation state indication LED (460) of the Iris Identification Device (400) is a light emitting diode (LED) and indicates a verification result in red, green or yellow color based on an execution of the iris identification program of the DSP Processor.

The Battery (480) of the Iris Identification Device (400) is a secondary battery such as a lithium-ion battery and is used as a power source for driving the Iris Identification Device (400) and the storage device (1) in a state that the storage device (1) is not connected with the USB terminal of the computer. The battery is designed to charge using the power of the computer supplied through the USB port when the storage device (1) is connected with the USB terminal of the computer.

The Locking Switch (470) of the Iris Identification Device (400) is constituted so that the power is supplied from the battery to the Iris Identification Device (400) or is disconnected therebetween in accordance with an operation of a user. When the Locking Switch (470) is in the locked mode, the power is disconnected, and when the Locking Switch (470) is in the unlocked mode, the power is supplied to the Iris Identification Device (400). Here, the operation state indication LED (460) blinks in a yellow color which means a verification standby state. In the verification standby state, the iris identification program operates on the DSP Processor and starts verification. Only when, as a result of the verification, the connected user is a verified user, the Data Storage Controller (300) allows an access allowance state and the operation state indication LED (460) to blink in a green color. However, as a result of the verification, when the connected user is not a verified user, even when the Locking Switch (470) is in the unlock mode, the Data Storage Controller (300) allows an access disconnection state and the operation state indication LED (460) to blink in a red light.

Therefore, the Iris Identification Device (400) is driven by the power of the Battery (480) without using an external power and receives an iris image from the Camera (420) based on the DSP Processor and iris identification program, creates an iris code, compares with the previously stored original iris code, judges the person registered, and controls the locking state of the Data Storage Controller (300).

The operation of the iris identification system integrated USB storage device (1) according to the present invention will be described with reference to FIGS. 1 and 2.

When the user switches the Locking Switch (470) of the Iris Identification Device (400) installed in the USB storage device (1) from the locked state to the unlocked state, the power is supplied to the elements of the storage device (1) including the Iris Identification Device, and the Iris Identification Device becomes the verification standby state. At this time, the operation state indication LED (460) blinks in a yellow color, and the Data Storage Controller (300) is in the access disconnection state, and the USB interface unit (100) is in a state that the access to the Data Storage (200) is impossible.

In the verification standby state, the DSP Processor (410) of the Iris Identification Device (400) loads the iris identification program from the Program Memory (430) and executes the loaded program. Here, the iris identification program operates in the registration mode when the original iris code is not stored in the Iris Code Memory (440). When the original iris code is stored therein, it operates in the verification mode.

When the user allows the iris to get close to the Camera (420) for the verification, the iris identification program of the DSP Processor (410) captures an iris image and creates an iris code. In the registration mode, the created iris code is stored at the Iris Code Memory (440) as an original iris code. In the case of the verification mode, the created iris code and the original iris code of the Iris Code Memory (440) are compared, and the matching state is judged. As a result of the judgment, when the codes are matched, the Data Storage Controller (300) allows the access. The operation state indication LED (460) blinks in a green color. Therefore, when the user connects the USB port to the computer USB terminal, the USB controller (120) of the USB interface unit (100) of the storage device (1) is allowed to access the Data Storage (200) through the Data Storage Controller (300) which is in the access allowance state, so that the data exchange is performed between the computer and the Data Storage (200). However, when the created iris code and the original iris code are not matched, the Data Storage Controller (300) allows the access disconnection state and allows the operation state indication LED (460) to blink in a red color. Therefore, in the case that the Data Storage Controller (300) is in the access disconnection state, even when the storage device (1) is connected with the computer through the USB interface, the access to the Data Storage (200) of the storage device (1) is not possible by the Data Storage Controller (300), so that the leakage of the data of the Data Storage (200) is prevented.

INDUSTRIAL APPLICABILITY

The iris identification system integrated USB storage device (1) according to the present invention is well adapted to the computer as well as the mobile devices such as PDA, mobile communication devices, etc.

The invention claimed is:

1. A USB (Universal Serial Bus) storage device equipped with an iris identification system, comprising:
    a USB interface unit including a USB port interfacing with USB terminal of a computer to exchange data with the computer, and a USB controller adapted to control a data transmission between the USB port and a data storage;
    a data storage storing data inputted from the computer through the USB interface unit;
    a data storage controller allowing the computer to access the data storage through the USB interface unit or preventing the computer from accessing the data storage through the USB interface unit;
    an iris identification device including a secondary battery; and
    a locking switch which allows the storage device to be locked or unlocked by supplying power from the secondary battery to the iris identification device based on a user's operation,
    wherein the iris identification device generates an iris code from an iris image inputted from an iris camera and compares a stored original iris code with the generated iris code, and controls the data storage controller to allow or prevent an access to the data storage according to whether or not the compared iris codes match each other.

2. The USB storage device of claim 1, wherein the iris identification system includes:
    an iris camera taking and transmitting an iris image;
    an iris code memory storing an original iris code;
    a program memory storing an iris identification program that generates an iris code from the iris image taken by the iris camera, compares the original iris code with the generated iris code, and controls the data storage controller to allow or prevent an access to the data storage according to whether or not the compared iris codes match each other;
    a DSP (Digital Signal Processor) processor executing and controlling the iris identification program stored in the program memory;
    a temporary memory used by the DSP processor; and
    an LED (Light Emitting Diode) indicating an operation state of the USB storage device according to whether or not the compared iris codes match each other.

3. The USB storage device of claim 1, wherein the data storage stores the original iris code.

4. The USB storage device of claim 1, wherein the data storage stores the iris identification program that generates an iris code from the iris image taken by the iris camera, compares the original iris code with the generated iris code, and controls the data storage controller to allow or prevent an access to the data storage according to whether or not the compared iris codes match each other.

5. The USB storage device of claim 1, wherein the battery is rechargeable by power supplied from the USB terminal of the computer to the USB storage device through the USB port.

* * * * *